United States Patent [19]
Greer

[11] 4,188,964
[45] Feb. 19, 1980

[54] TRAVEL AWNING

[75] Inventor: Bradley G. Greer, Long Beach, Calif.

[73] Assignee: A & E Plastik Pak Co. Inc., Industry, Calif.

[21] Appl. No.: 912,758

[22] Filed: Jun. 5, 1978

[51] Int. Cl.² .............................................. E04F 10/06
[52] U.S. Cl. ............................... 135/5 AT; 135/7.1 A; 160/67
[58] Field of Search ................. 135/5 AT, 5 A, 7.1 A, 135/7.1 R; 160/66, 67, 68, 22

[56] References Cited
U.S. PATENT DOCUMENTS

| 3,923,074 | 12/1975 | McKee | 160/68 |
| 4,020,888 | 5/1977 | Upton | 135/5 AT |

Primary Examiner—Reinaldo P. Machado
Attorney, Agent, or Firm—Ellsworth R. Roston

[57] ABSTRACT

A travel awning for attachment to the side of a vehicle, including an elongated housing for receiving and storing component members of the travel awning, the elongated housing formed from a main housing and a cover housing and with at least some of the component members of the travel awning received partially within the main housing and partially within the cover housing when the housings are closed to a storage position, the cover housing hinged along a bottom portion of the main housing to rotate downward when the housings are opened to an open position and with some of the component members of the travel awning received within the main housing and with some of the component members of the travel awning received within the cover housing when the housings are in the open position, and the housings when in the open position providing unrestricted access to all of the component members of the travel awning.

33 Claims, 10 Drawing Figures

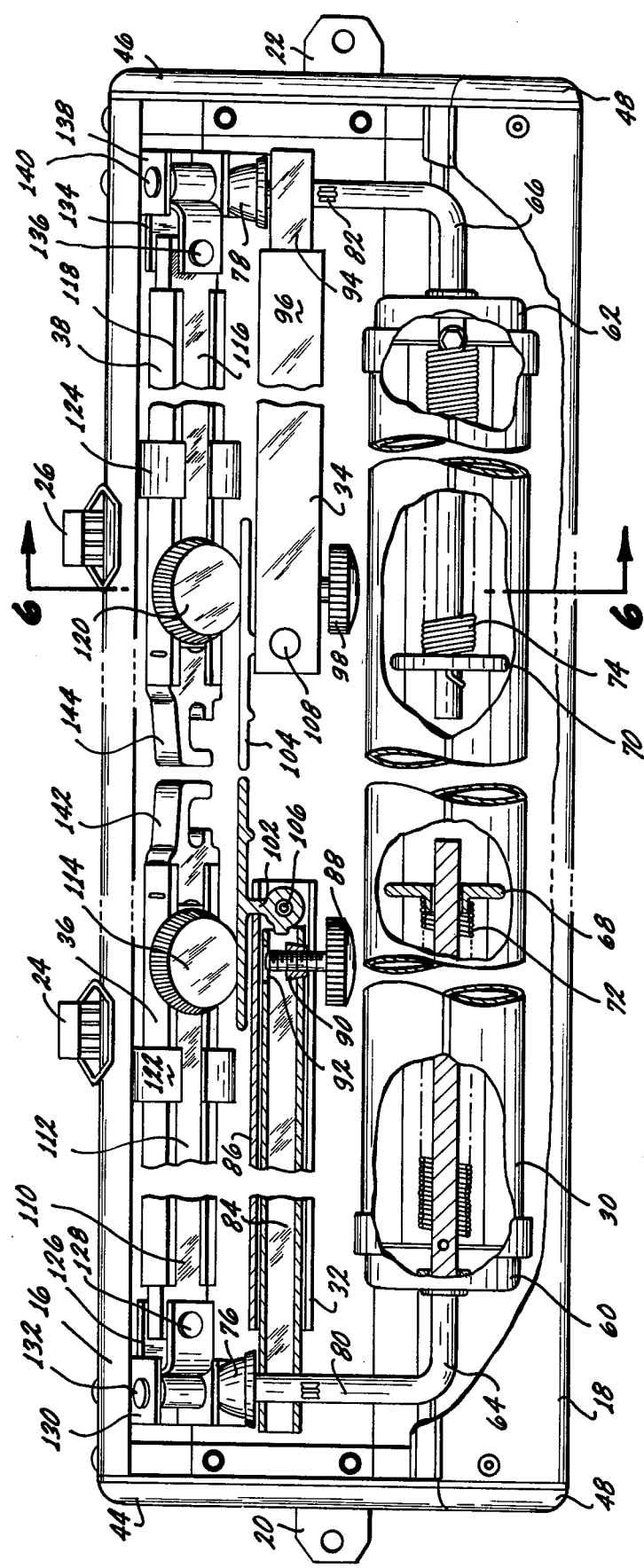

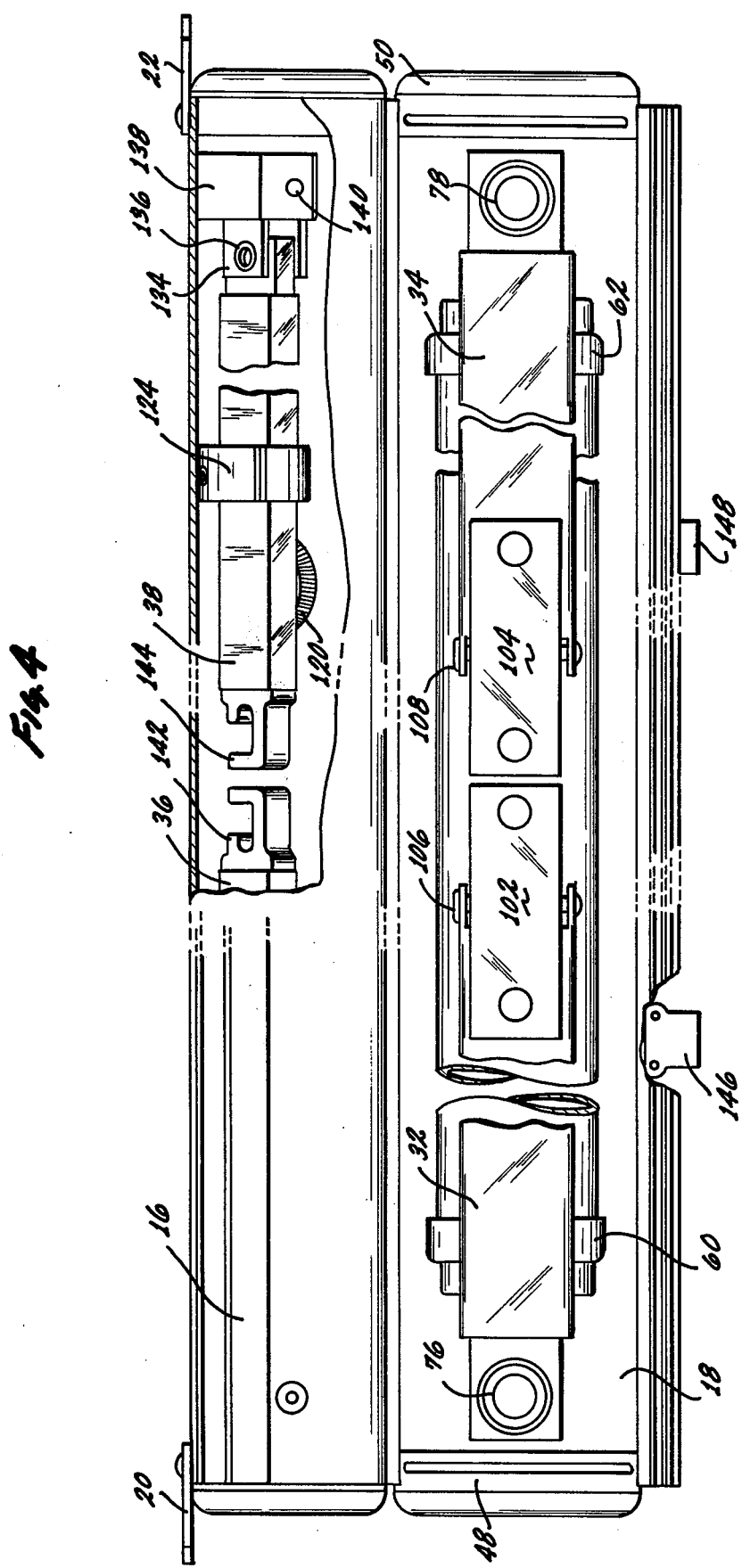

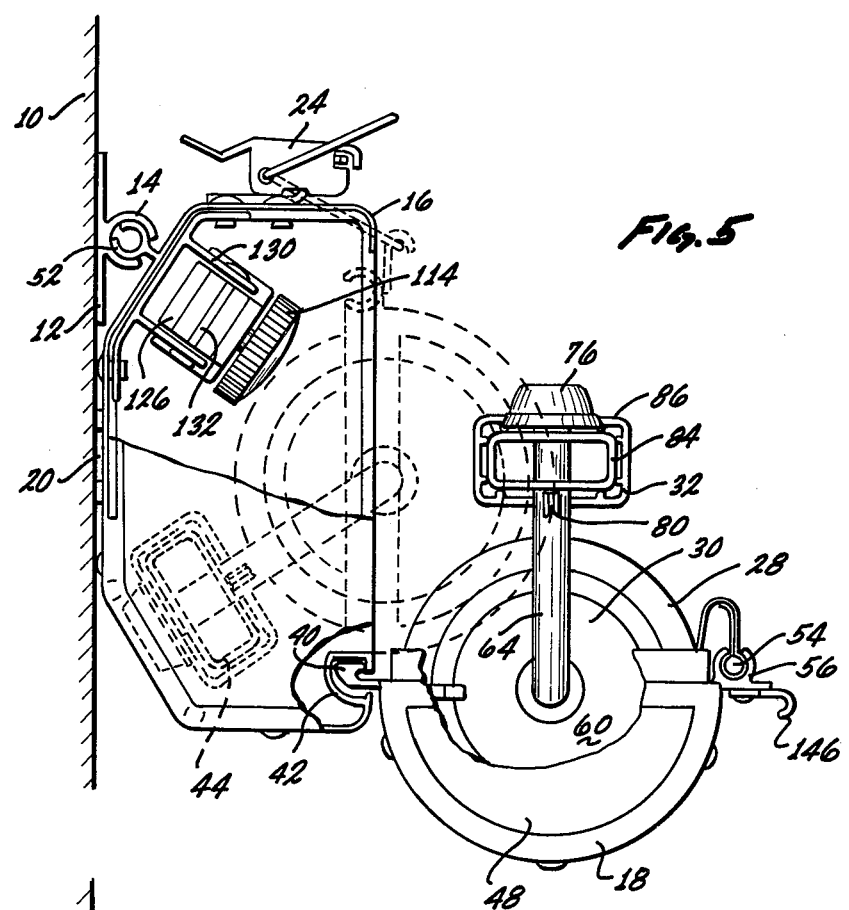
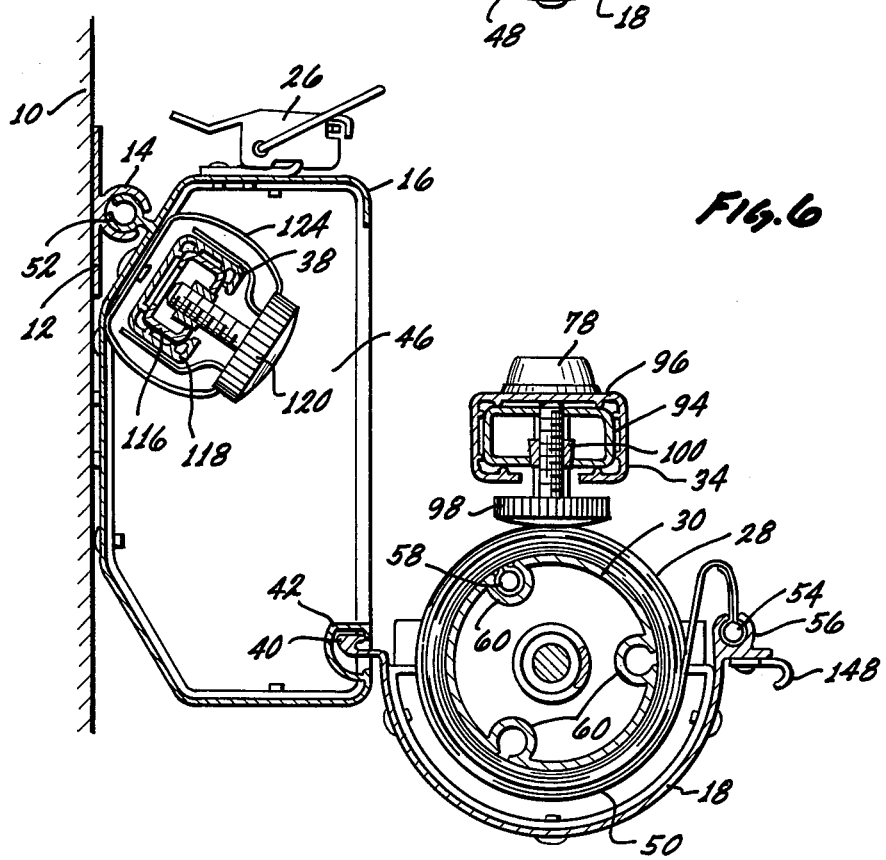

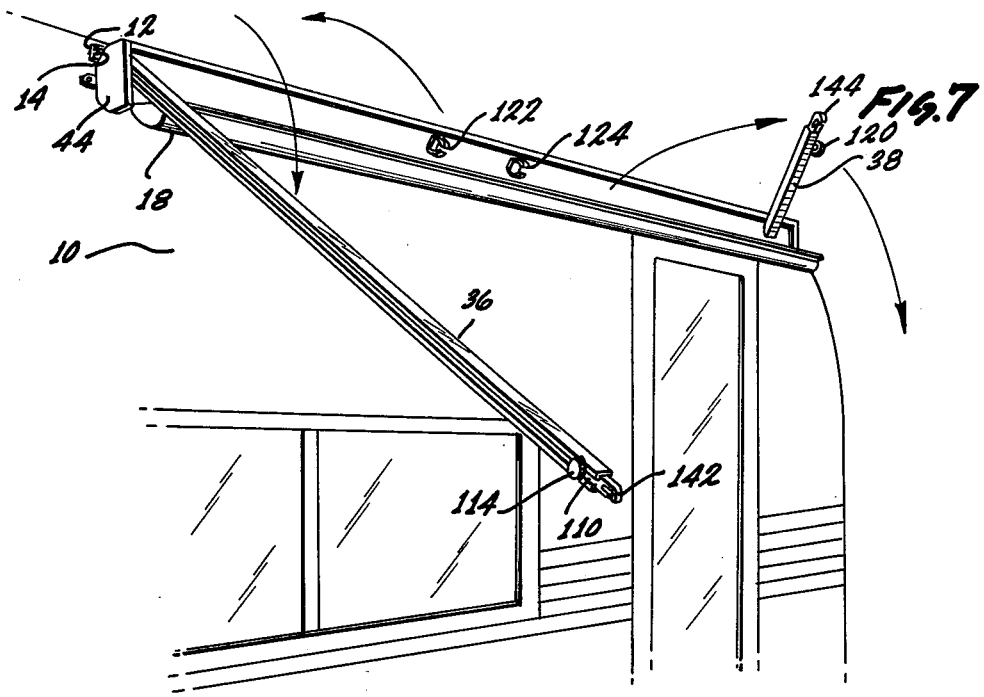
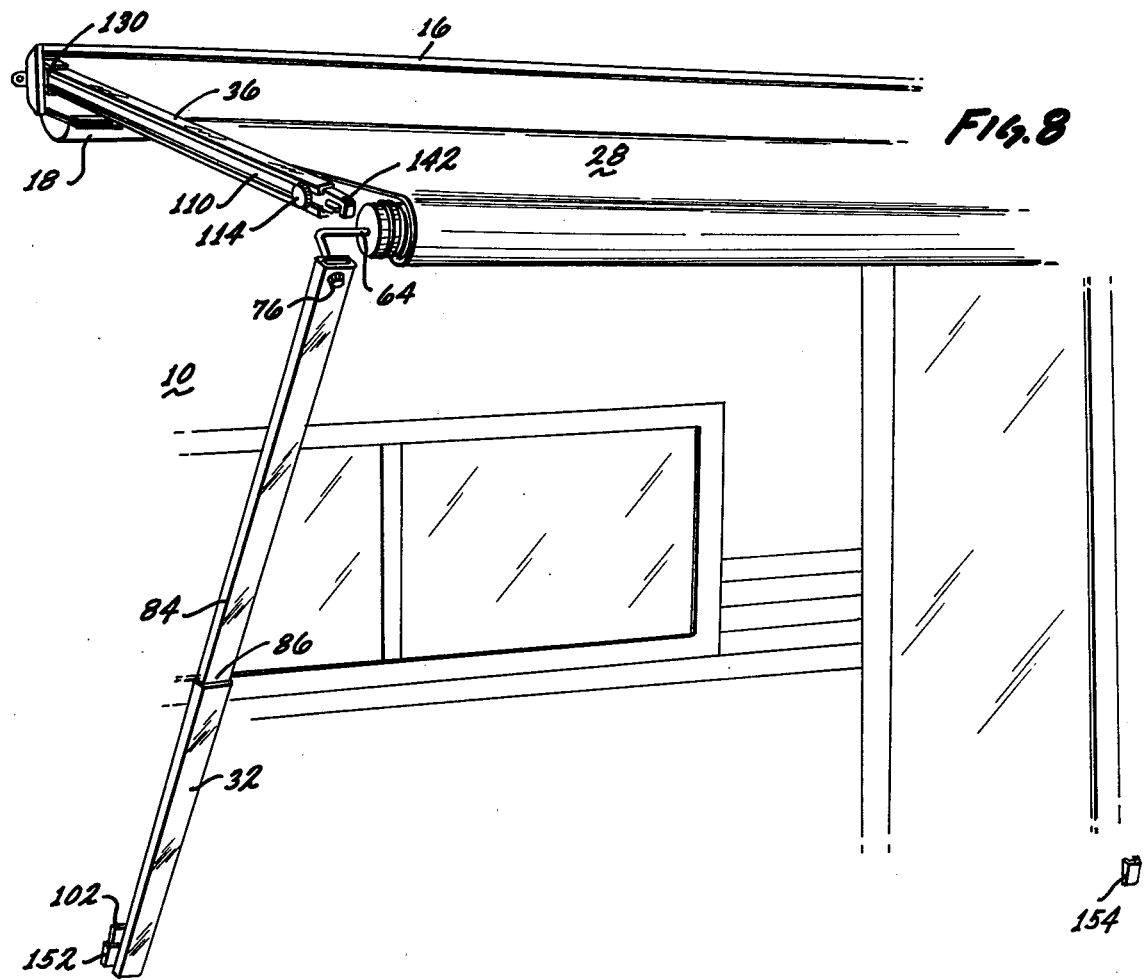

TRAVEL AWNING

The present invention relates to a travel awning and specifically a travel awning wherein the awning components are stored in an enclosed housing formed as an elongated box.

In the prior art, awnings for trailers and recreational vehicles have been used when the vehicle was parked and with the awning extending from the side of the vehicle so as to provide for a shady area to the side of the vehicle and to shield one side of the vehicle from the sun. One type of prior art awning structure has included an enclosed housing formed as an elongated box for receiving and storing the awning components when the awning is not in use. The elongated box enclosing the awning components is attached to the side of the vehicle and this type of awning is referred to as a box awning.

In the prior art box awnings, the box normally includes a main housing and a cover which lifts to expose the interior of the main housing and with the various components of the awning structure contained within the main housing portion. In these prior art box awnings, substantially all of the various awning components are located within the main housing and all of the various elements must be removed from within the main housing in order to erect the awning to a particular configuration.

Usually the awning structure of the prior art devices includes a tension roller mechanism for supporting an awning fabric wound around the roller mechanism and with the outer end of the awning fabric attached along a line within the main housing of the box. Additionally, the main housing may enclose at least two main support arms which are used to extend from the ends of the tension roller mechanism down to the ground or to a position on the side of the vehicle near the ground. Also enclosed within the main housing in the prior art devices are rafter arms which are used to extend from within the main housing to the ends of the tension roller mechanism. The rafter arms and main support arms are used to provide for side support structures for the tension roller mechanism and the awning fabric as they are unrolled away from the side of the vehicle.

Generally the prior art devices are heavy, cumbersome and difficult to operate. Specifically, when the cover is pulled up to expose the awning components within the main housing, all of the components are crammed into the housing and are difficult to access. The present invention is directed to a lightweight travel awning having its components stored in a housing formed as an elongated box, and which travel awning provides for easy access to the various components of the awning when the box is opened and thereby allows for an easier assembly of the awning to a desired position.

Specifically, the awning of the present invention includes an elongated box formed from a main housing and a cover housing and wherein the cover housing is hinged along a bottom edge of the main housing so that the cover housing rotates downward to an open position. The tension roller mechanism and the awning fabric wound thereon are at least partially contained within the cover housing so when the cover housing is released to rotate downward, the tension roller mechanism and awning fabric also rotate downward to expose the interior of the main housing. The main support arms are pivoted from the ends of the tension roller mechanism and when the cover housing is in the open position, the main support arms are exposed for easy access. The rafter arms are pivoted from the back and at the ends of the main housing but when the cover housing is rotated downward, the interior of the main housing is exposed so that the rafter arms are also easily accessed.

In the travel awning of the present invention, the end of the awning fabric is connected to a front edge of the cover housing so that when the tension roller is removed from the cover housing and the awning fabric is unrolled from the tension roller mechanism, the cover housing itself serves as a part of the awning providing shade and specifically serves as the part of the awning closest to the vehicle. This shortens the length of fabric needed for the awning and also eliminates the fabric rubbing on any portion of the cover structure.

The travel awning of the present invention therefore provides for all of the awning components being contained within an elongated box during storage, but with the entire structure being lightweight and with all of the awning components being easily accessed so as to facilitate the removal of the components during the setup of the awning to a desired position. A clearer understanding of the invention will be had with reference to the following description and drawings wherein:

FIG. 3 illustrates a front view of the travel awning of the present invention with the cover housing rotated down and showing the various components in detail and with portions broken away for greater clarity;

FIG. 4 illustrates a top view of the travel awning of FIG. 3;

FIG. 5 illustrates a side view of the travel awning of FIG. 3, and with end portions broken away for greater clarity;

FIG. 6 illustrates a cross-sectional view of the travel awning of FIG. 3 taken along lines 6—6 of FIG. 3;

FIG. 7 illustrates the travel awning of the present invention attached to the side of the vehicle and with the rafter arms being removed from the interior of the main housing;

FIG. 8 illustrates the travel awning of the present invention and with the main support arms attached to the side of the vehicle and with the awning fabric partially unrolled;

Figure 1:
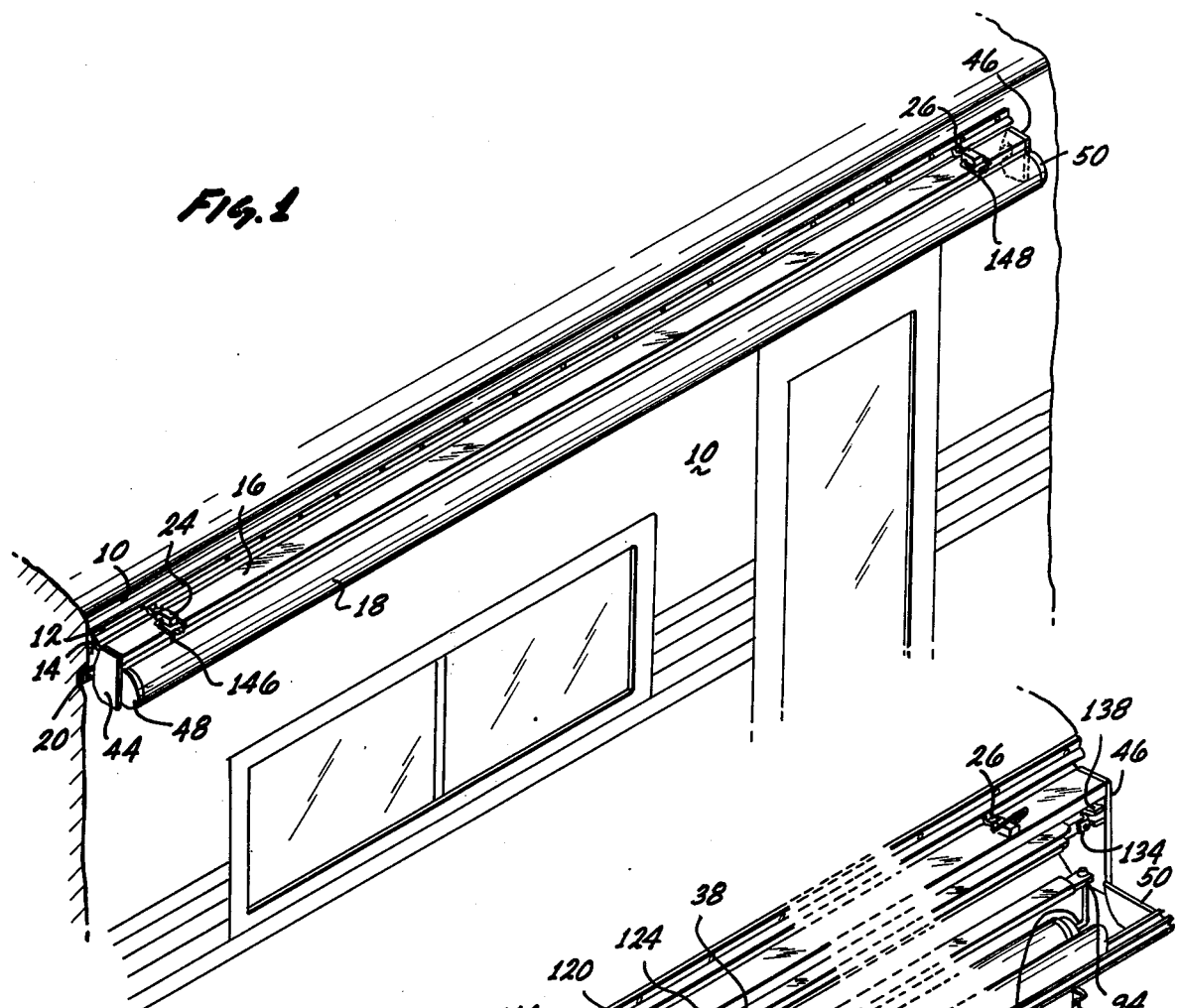
FIG. 1 illustrates the travel awning of the present invention attached to the side of a vehicle and in a storage position with the awning components within an elongated box and with the cover housing closed.

In FIG. 1, the travel awning of the present invention is shown attached to the side of a vehicle 10 through the use of an awning rail 12 having a groove 14. The various components of the travel awning are enclosed for storage within a box having a main housing 16 and a cover housing 18. An integral bead member on the back of the main housing 16 fits within the groove 14 in the rail 12 so that the entire awning structure is supported along the side of the vehicle 10, and with the weight of the travel awning distributed along the length of the rail 12.

The entire awning structure may be removed by sliding the bead out of the groove 14. Ear members 20 and 22 may extend from the back of the main housing 16 and and may be used to provide for additionally securing the travel awning in position along the side of the vehicle. The cover housing 18 is secured to the main housing 16 using latch members 24 and 26. The latch members 24 and 26 hold the cover member 18 in the closed position so that all of the various awning components are contained within the total housing formed by the main housing 16 and the cover housing 18.

Figure 2:
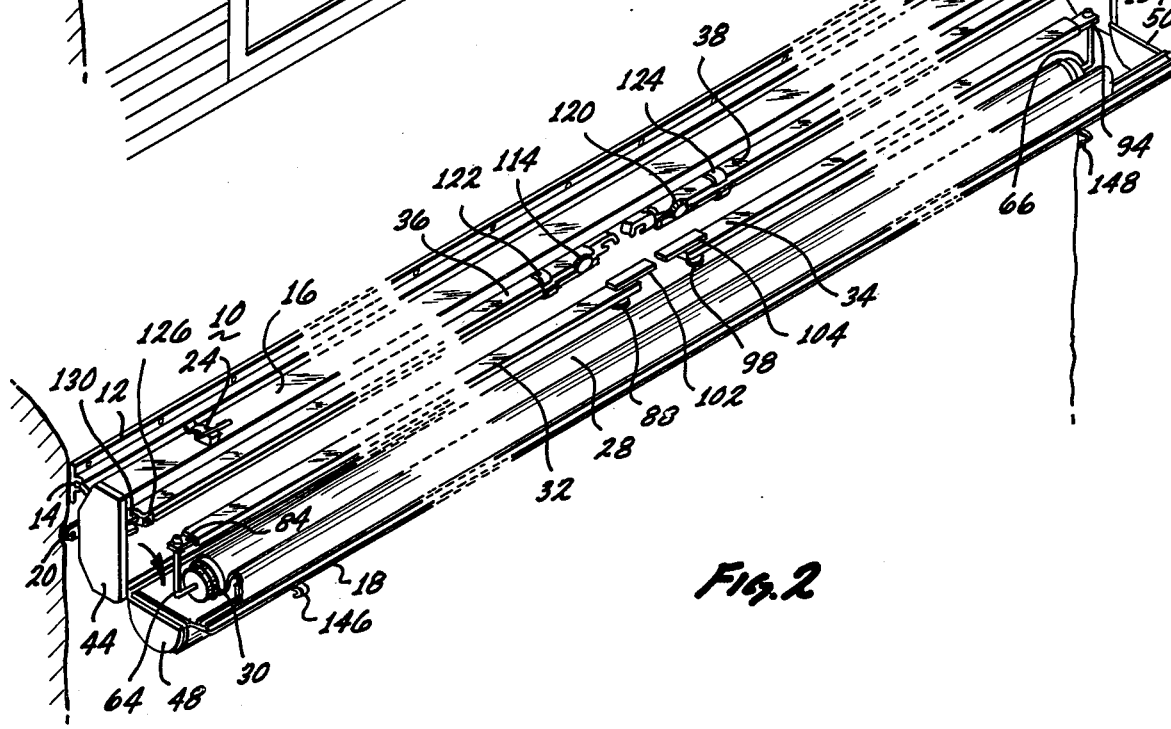
FIG. 2 illustrates the travel awning of the present invention with the cover housing opened downward to expose the awning components.

When the latch members 24 and 26 are released, the cover housing 18 may rotate downward as shown in FIG. 2 to expose the various awning components. Specifically, the awning components include an awning fabric 28 rolled on a tension roller mechanism 30. Also a pair of main support arms 32 and 34 are coupled to opposite ends of the tension roller mechanism 30. Positioned in the back and towards the top of the main housing 18 are a pair of rafter arms 36 and 38. As can be seen in FIG. 2, when the cover housing 18 is unlatched and rotated downward, all of the various components of the travel awning are exposed for easy access so that the main support arms and rafter arms may be pivoted out to operable positions and with the tension roller mechanism removed from the cover housing 18 and rotated to unroll the awning fabric 28. By adjusting the various components, the travel awning may be set up at any desired position.

The cover housing is shaped, in cross-section, in the form of a well to receive the awning fabric in the wound condition of the fabric. Preferably, the well has an arcuate shape corresponding to the arcuate shape defined by the roll of awning fabric. This arcuate shape may be in the form of a semicircle in cross-section. In this way, the cover housing retains the awning fabric in the open and closed positions of the cover housing relative to the main housing and during the movement of the cover housing between the open and closed positions. Furthermore, the main support arms extend into the main housing in the closed position of the cover housing relative to the main housing.

FIGS. 4 through 6 illustrate the various components of the travel awning in greater detail and show the specific interrelationship of the various elements. For example, FIG. 3 illustrates the travel awning from a front position and shows some of the elements broken away to expose internal details and other of the elements in cross section to again show internal details. In the top view of FIG. 4 of the travel awning, some portions are broken away for greater clarity and the side view in FIG. 5 also shows portions broken away for greater clarity.

As can be seen from FIGS. 5 and 6, the main housing 16 and the cover housing 18 are hinged together along their length through the use of an integral bead portion 40 which is part of the cover housing and an integral groove 42 which formed in the main housing 16. This type of integral hinge arrangement distributes the hinge load completely along the length of the housing. The bead 40 would be slid into the groove 42 to interlock the main housing 16 and the cover housing 18.

Cap members 44 and 46 are used for the right and lefthand sides of the main housing 16 and these cap members when in position close off the ends of the groove 42 and prevent the bead 40 from sliding out of the groove 42. Cover housing 18 includes similar cap members 48 and 50 to close off the end of the cover housing 18. The use of the various cap members therefore provides for the housing to be completely enclosed when the cover housing 18 is in the closed position as shown in FIG. 1. This provides for all of the various awning components being contained within the enclosed housing and thereby providing for protection for the various awning components.

As described above, the main housing includes an integral external bead which is positioned within the groove 14 in rail 12 shown in FIGS. 1 and 2. This may be seen with greater clarity in FIGS. 5 and 6 wherein an integral bead 52 is shown extending from a back wall of the main housing 16 and positioned within the groove 14 in the rail 12. This type of structure provides for the uniform distribution of load along the length of the housing and the rail so that no one portion of the structure need be subjected to a great load. This allows the housing and other components of the awning structure to be made of relatively lightweight materials so that the total weight of the travel awning of the present invention is relatively light in weight compared to prior art devices.

FIG. 5 illustrates a side view of the travel awning of the present invention and specifically illustrates the awning fabric 28 rolled around the roller mechanism 30. The outer end of the awning fabric 28 is formed with a bead structure 54. This bead structure is contained within an integral groove portion 56 formed in a front edge of the cover housing 18.

FIG. 6 illustrates a cross-sectional view of the travel awning and it can be seen that in addition to the bead 54 at the outer end of the awning fabric 28, a similar bead 58 is provided at the inner end of the awning fabric. The inner bead 58 is received within any one of three integral grooves 60 in the roller mechanism 30. In this way, both the inner and outer ends of the awning fabric 28 includes integral beads to fit within grooves so that the awning fabric is attached to the roller mechanism and to the front edge of the cover housing and with the attachment occurring substantially along the length of the cover housing and roller mechanism.

It can be seen with reference to FIGS. 5 and 6 and at later portions of this specification that when the roller mechanism and the awning fabric is removed from the cover housing to be positioned outside of the cover housing using the various support arms, the cover housing 18 itself forms a first portion of the awning which extends from the main housing 16. In this way, the actual length of awning fabric is reduced and in addition, since the awning extends from the front edge of the cover housing 18, the awning fabric will not rub on any metal portions of the housing. This reduces wear and prevents the awning fabric from wearing out due to such rubbing.

The main part of the roller mechanism 30 is formed as a tube which supports the awning fabric. In addition, end caps 60 and 62 are positioned over and attached to the ends of the tube and are used to provide bearing support for torsion rods 64 and 66. These torsions rods 64 and 66 extend from within the tube portion of the roller mechanism and to an external position. At the external position each torsion rod is formed with a righthand turn.

Torsion rod stabilizers 68 and 70 receive the inner end of the torsion rods 64 and 66 and the combination of the torsion rod stabilizers and the end caps provide for bearing surfaces for the torsion rods to allow the torsion rods to rotate within the tube. The torsion rod stabilizers 68 and 70 are prevented from rotation since they have an external configuration to match the internal configuration of the tube of the roller mechanism 30. Specifically, as seen in FIG. 6, the grooves 60 provide for internal protuberances and the torsion rod stabilizers have a similar external configuration to match the internal configuration of the tube.

Torsion springs 72 and 74 are wound about the torsion rods 64 and 66 and are coupled at one end to the torsion rod and at the other end to the torsion rod stabilizers 68 and 70. As the awning fabric 28 is unwound, the tube portion of the roller mechanism 30 rotates. This rotation of the tube occurs around the torsion rods 64 and 66 and the torsion springs 72 and 74 are actuated to provide for a tension in the awning fabric.

The exterior right angle portions of the torsion rods 64 and 66 fit through openings in the main support arms 32 and 34 so that the main support arms may rotate around the right angle portions of the torsion rods 64 and 66. The main support arms are held in position for rotation and prevented from sliding along the torsion rods through the use of cap members 76 and 78 and pin members 80 and 82.

It can also be seen that the main support arms 32 and 34 are actually formed by two tubular members sliding within each other. Specifically, support arm 32 is formed by inner tubular member 84 sliding within outer tubular member 86. A lock knob 88 having a bolt portion is threaded through a nut insert 90 in the inner tubular member 84. The bolt portion of the lock knob 88 passes through an opening 92 in the inner tubular member 84 so as to contact the outer tubular member 86 when the lock knob is tightened. The outer tubular member 86 is also slotted so that the bolt portion of the lock knob 88 may pass as the tubular members 84 and 86 are slid relative to each other.

Main support arm 34 is similarly constructed with an inner tubular member 94 and an outer tubular member 96 and with a lock knob 98 having a bolt portion threaded through a nut insert 100 so as to provide for locking of the tubular members. Located at the ends of the main support arms 32 and 34 and specifically at the ends of the outer tubular members 86 and 96 are foot pads 102 and 104. These foot pads are pivotable about pin members 106 and 108 so that the foot pads may be pivoted to accommodate varying mounting surfaces. For example, the foot pads at the ends of the main support arms may be mounted against the side of the vehicle or on the ground.

The rafter arms 36 and 38 are constructed in a similar manner to the main support arms 32 and 34. Specifically, rafter arm 36 includes an inner tubular member 110 and an outer tubular member 112. These two members may slide relative to each other and are locked in position using a lock knob 114. Rafter arm 38 is formed of a first inner tubular member 116 sliding within an outer tubular member 118 and with a lock knob 120 providing locking of the tubular members.

When the rafter arms 36 and 38 are in the stored position, they are fully collapsed and are held in the back and toward the top of the main housing 16 by clips 122 and 124. The inner ends of the rafter arms are held for rotation in two planes using bracket members. Specifically, the inner tubular member 110 is pinned to a bracket member 126 by pin member 128. This allows for rotation of the rafter arm 36 around pin member 128.

The bracket 126 is in turn pinned to a bracket member 130 with pin member 132. This allows for rotation of the rafter arm 36 in a second direction.

The rafter arm 36 may be pulled outward and slightly downward to release the rafter arm from the clip 122 and provide for rotation of the rafter arm around the pin member 132 and out of the main housing. The rafter arm 36 may then be rotated either up or down around pin member 128. Rafter arm 38 has its inner end similarly coupled to a bracket arm 134 around pin member 136 and with bracket 134 in turn pivoted around bracket 138 through the use of pin member 140.

The outer end of the rafter arms 36 and 38 and specifically the inner tubular members 110 and 116 are formed with hook portions 142 and 144. These hook portions are used to engage the portion of the torsion bar 64 and 66 immediately adjacent the caps 60 and 62.

It can be seen in FIGS. 3 through 6 that when the cover housing 18 is rotated downward, this brings with it the roller mechanism 30 supporting the awning fabric 28 and the main support arms 32 and 34 which are fully collapsed. On the other hand, when the cover housing 18 is rotated backward to close the housing assembly, this rotates the main support arms 32 and 34 to a position within the main housing 16 and also rotates a portion of the roller mechanism 30 and awning fabric 28 to within the main housing 16. This is shown in the dotted position in FIG. 5, and in this closed position, the main housing 16 and cover housing 18 may be latched together using latch mechanisms 24 and 26 and with these latch mechanisms engaging catches 146 and 148 extending from the cover housing 18.

When the housings are unlatched from each other and the cover housing rotated downward, this exposes all of the various components of the awning assembly and provides easy access to these components so that the awning assembly may then be set up to a desired position in a rapid and simple fashion. The setup of the awning assembly to different desired positions may be seen with reference to FIGS. 7 through 10.

In FIG. 7, the travel awning is shown attached to the side of vehicle 10 and with the cover housing unlatched and rotated to the down position and with one rafter arm 36 fully removed from the back of the main housing 16 and with the second rafter arm 38 in a partially removed position. It is to be appreciated that the main support arms 32 and 34 may be pivoted outward before or after the rafter arms 36 and 38 are removed from the main housing.

In FIG. 8, the left side of the travel awning is shown and with the main support arm 32 pivoted downward and attached to the side of the vehicle 10. The main support arm is attached by having the foot pad 102 slipped into a bracket 150 mounted on the side of the vehicle 10. A similar bracket 152 is mounted on the side of the vehicle 10 to receive the foot pad 104 at the end of the main support arm 34. In FIG. 8, the hook end 142 of the rafter arm 36 is shown just prior to engaging the end of the torsion rod 64.

Figure 9:
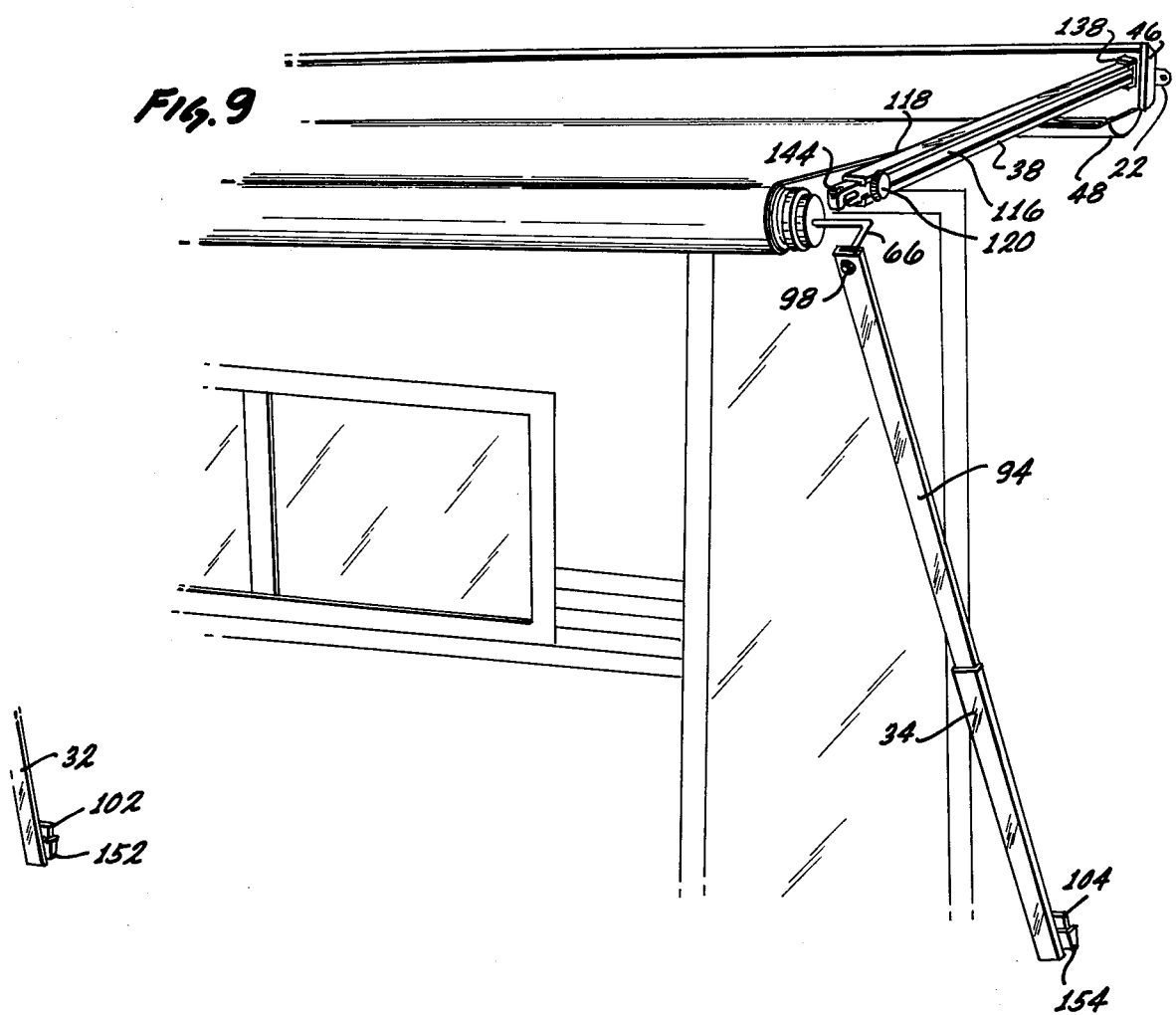
FIG. 9 illustrates the intercoupling of a rafter arm, a main support arm, and one end of the tension mechanism.

FIG. 9 illustrates the right side of the travel awning shown in FIG. 8 wherein the hook end 144 is in engagement with the end of the torsion rod 66. It can be seen that the hook end is slipped down over the end of the torsion rod 66, and then the rafter arm 36 is pushed forward so that the torsion rod 66 seats at the back portion of the hook 144.

Figure 10:
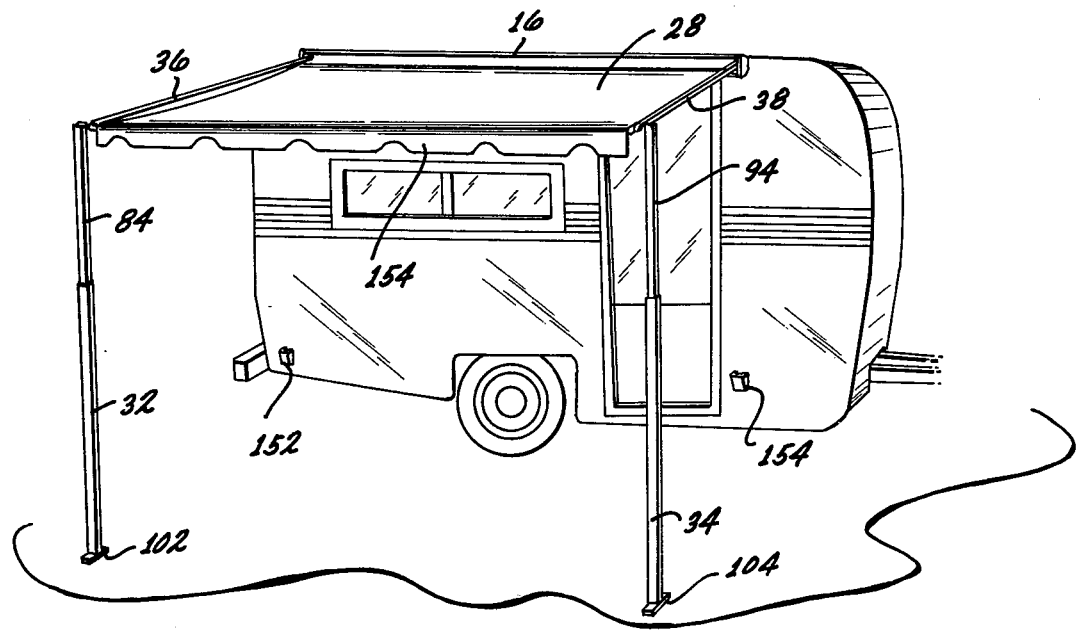
FIG. 10 illustrates the awning fabric unrolled to a fully unrolled position and with the main support arms extending downward to the ground.

In FIG. 10, the travel awning is shown in a fully extended position wherein the main support arms 32 and 34 are positioned vertically from the ground to support the awning fabric 28 at its maximum extended position. In this position, it can be seen that the end of the awning fabric 28 includes an integral valance portion 154. The brackets 152 and 154 can be seen mounted onto the side of the vehicle so as to receive the foot pads 102 and 104 when desired. Normally, if the awning is pulled out to its fully extended position the main support arms 32 and 34 would be placed in the vertical position. However, in intermediate positions for the awning fabric, it may be desirable to mount the main support arms in the angular position shown in FIGS. 8 and 9.

It is to be appreciated that the lengths of the main support arms and rafter arms may be adjusted to any desired position since they are in sliding engagement and can be locked in any position using the lock knobs. This provides for extreme flexibility in setting up the awning in any desired position.

The present invention is therefore directed to a lightweight, easily assembled travel awning wherein the cover of the housing serves as a first portion for the awning and provides for storage of portions of the awning so that when the cover is rotated downward, it exposes all of the various awning components and provides for easy access of these components to facilitate the setting up of the travel awning.

Although the invention has been described with reference to a particular embodiment, it is to be appreciated that various adaptations and modifications may be made and the invention is only to be limited by the appended claims.

I claim:

1. A travel awning for attachment to the side of a vehicle, including
   an elongated housing for receiving and storing the travel awning,
   component members in the travel awning for supporting the travel awning to the side of the vehicle in an extended position of the travel awning,
   the elongated housing being formed from a main housing and a cover housing, at least some of the component members of the travel awning being received at least partially within the main housing and others of the component members of the travel awning being received at least partially within the cover housing when the main and cover housings are closed to a storage position,
   the cover housing being hinged along a bottom portion of the main housing to rotate downwardly when the housings are separated to an open position and some of the component members of the travel awning being received within the main housing and at least some of the other ones of the component members of the travel awning being supported by the cover housing when the housings are in the open position, and
   the main and cover housings when in the open position providing unrestricted access to all of the component members of the travel awning.

2. The travel awning of claim 1 wherein the component members of the travel awning include a roller mechanism and awning fabric wound around the roller mechanism and having a bead at the outside edge and wherein the front edge of the cover housing in the open position includes a groove to receive the bead and forms a first portion of the awning adjacent the main housing when the roller mechanism and the awning fabric are removed from the housing and unrolled for setting up the travel awning.

3. The travel awning of claim 1 wherein the main housing includes an integral bead extending from the back of the main housing for attaching the travel awning to the side of the vehicle.

4. The travel awning of claim 1 wherein the component members of the travel awning include main support arms and rafter arms pivotable between a storage position in the main housing in the closed positions of the main and cover housings and a position extending outwardly from the housings in the open position of the main and cover housings for setting up the travel awning.

5. The travel awning of claim 4 wherein each of the main support and rafter arms is formed of at least two slidable members and a lock means is provided for each pair of slidable members for locking the slidable members in desired positions for setting up the travel awning.

6. The travel awning of claim 5 wherein the slidable members are slid to a fully collapsed state in the storage position with the main and cover housings in the closed positions.

7. The travel awning set forth in claim 1 wherein the component members include:
   a roller supported on the cover housing,
   awning fabric wound on the roller and having properties of being unwound from the roller when the cover housing is rotated downwardly from the main housing,
   at least one rafter arm having first and second opposite ends and pivotably attached at one end to the main housing and releasably attachable at the other end to the roller when the awning fabric has been at least partially unwound from the roller, and
   at least one main support arm having first and second opposite ends and pivotably attached at one end to the roller and releasably attachable at the other end to the side of the vehicle when the awning fabric has been at least partially unwound from the roller.

8. The travel awning set forth in claim 7 wherein
   a second rafter arm is provided with the same construction as the first rafter arm and the first and second rafter arms are pivotably attached at their first ends to opposite ends of the main housing and a second main support arm is provided with the same construction as the first support arm and the first and second main support arms are pivotably attached at their first ends to opposite ends of the roller.

9. The travel awning set forth in claim 8 wherein means are provided in the main housing to retain the second ends of the rafter arms in releasably fixed relationship to the main housing.

10. The travel awning set forth in claim 9 wherein
    means are provided on the cover housing for releasably retaining the end of the awning fabric when the awning fabric is wound on the roller or when the cover fabric is unwound from the roller.

11. The travel awning set forth in claim 7 wherein
    the cover housing is shaped to retain the roller and the awning fabric in the wound relationship of the awning fabric on the roller when the cover housing is in the closed position relative to the main housing and to retain the roller and the awning fabric as the cover housing is moved from the closed position to the open position relative to the main housing and wherein the main support arm extends into the main housing in the closed position of the cover housing.

12. The travel awning set forth in claim 11 wherein the cover housing is provided with an arcuate configuration to retain the roller and the awning fabric in the wound relationship of the awning fabric on the roller as the cover housing is moved between the open and closed positions relative to the main housing.

13. A travel awning for attachment to the side of a vehicle, including
an elongated housing for receiving and storing component members of the travel awning,
the elongated housing formed from a main housing and a cover housing and with at least some of the component members of the travel awning received partially within the main housing and partially within the cover housing when the housings are closed to a storage position,
the cover housing hinged along a bottom portion of the main housing to rotate downward when the housings are opened to an open position and with some of the component members of the travel awning received within the main housing and with some of the component members of the travel awning received within the cover housing when the housings are in the open position,
the housings when in the open position providing unrestricted access to all of the component members of the travel awning,
the component members of the travel awning including awning fabric wound around a roller mechanism and with the outside edge of the awning fabric formed as a bead and with the front edge of the cover housing in the open position for the housing including a groove to receive the bead and with the cover housing forming a first portion of the awning adjacent the main housing when the roller mechanism and the awning fabric is removed from the housing and unrolled for setting up the travel awning, and
the cover housing having a configuration complementary to the outer configuration of the awning fabric wound around the roller mechanism and with the awning fabric wound around the roller mechanism nested within the cover housing until removed for setting up the travel awning.

14. The travel awning of claim 13 wherein the component members of the travel awning include main support arms coupled to end portions of the roller mechanism and pivoted about such end portions to lie parallel to the awning fabric wound around the roller mechanism in the storage position and to be pivoted outward from the housings for setting up the travel awning.

15. The travel awning of claim 14 wherein the main support arms lie initially within the main housing in the storage position and are removed from the main housing when the cover housing is rotated downward to the open position.

16. The travel awning of claim 15 additionally including rafter arms coupled to end portions of the main housings and pivoted about such end portions to lie parallel to and within the main housing in the storage position and to be pivoted outward from the main housing for setting up the travel awning.

17. A travel awning formed from awning components for a vehicle of the type wherein the awning components when not in use are stored in an elongated box attached to the side of the vehicle and when in use extend from the elongated box and are set up to form the awnings, including
a main housing for attachment to the side of the vehicle,
a cover housing hinged to the main housing along a bottom edge of the main housing and with the main housing and the cover housing providing a closed box for storing awning components and with the box closed by rotating the cover housing upward and with the box opened by rotating the cover housing downward for providing access to the awning components, and
all of the awning components forming the travel awning stored in the closed box when not in use and with some of the awning components received in the main housing and with some of the awning components received in the cover housing when the cover housing is rotated downward to open the box.

18. The travel awning of claim 17 wherein awning components include awning fabric wound around a roller mechanism and with the outside edge of the awning fabric formed as a bead and with the front edge of the cover housing when rotated downward including a groove to receive the bead and with the cover housing forming a first portion of the awning adjacent the main housing.

19. The travel awning of claim 18 wherein the cover housing has a configuration complementary to the outer configuration of the awning fabric wound around the roller mechanism and with the awning fabric wound around the roller mechanism nested within the cover housing until removed for setting up the travel awning.

20. The travel awning of claim 19 wherein the awning components include main support arms coupled to end portions of the roller mechanism and pivoted about such end portions to lie parallel to the awning fabric wound around the roller mechanism when the components are stored and with the main support arms pivoted outward from the housings for setting up the travel awning.

21. The travel awning of claim 20 wherein the main support arms are received initially within the main housing when the housings form the closed box and are removed from the main housing when the cover housing is rotated downward.

22. The travel awning of claim 21 additionally including rafter arms coupled to end portions of the main housing and pivoted about such end portions to lie parallel to and within the main housing when the housings form a closed box and with the rafter arms pivoted outward from the main housing for setting up the travel awning when the cover housing is rotated downward.

23. The travel awning of claim 17 wherein the main housing includes an integral bead extending from the back of the housing for attaching the travel awning to the side of the vehicle.

24. The travel awning of claim 17 wherein the awning components include main support arms and rafter arms and with the arms pivoted around coupling points to lie parallel and to be received by the housings forming the closed box and with the arms pivoted outward for setting up the travel awning when the cover housing is rotated downward.

25. The travel awning of claim 24 wherein each arm is formed of two sliding members and a lock means for locking the sliding members in desired positions during the setting up of the travel awning.

26. The travel awning of claim 25 wherein the sliding members are slid to a full collapsed state when stored in the closed box.

27. The travel awning set forth in claim 17 wherein the awning components include:
   a roller rotatably supported on the cover housing,
   awning fabric wound on the roller and having properties of being unwound from the roller with the box in the opened condition,
   at least one rafter arm having first and second opposite ends and pivotably coupled at the first end to the main housing and being constructed at the second end for coupling to the roller, and
   at least one main support arm having first and second opposite ends and pivotably coupled at the first end to the roller and being constructed at the second end for coupling to the side of the vehicle.

28. The travel awning set forth in claim 27 wherein the cover housing extends, in the open position, in substantially the same direction as the awning fabric in the unwound relationship of the fabric to define a first portion of the awning and a support for the awning fabric.

29. The travel awning set forth in claim 28 wherein means are provided on the outer end of the awning fabric in the wound condition of the fabric to cooperate with means at the forward end of the cover housing in the open position of the cover housing to retain the awning fabric in the wound condition and in the unwound condition.

30. The combination set forth in claim 29 wherein the rafter arm is pivotably attached at the first end to one end of the main housing and is releasably attached at the second end to the main housing with the box closed and the main support arm is pivotally attached at the first end to one end of the roller.

31. The combination set forth in claim 30 wherein the second end of the rafter arm is releasably attached to the roller when the awning fabric is at least partially unwound from the roller and the second end of the main support arm is releasably attached to the side of the vehicle when the awning fabric is at least partially unwound from the roller.

32. The travel awning set forth in claim 27 wherein the cover housing is shaped as a well to receive the roller and the awning fabric in the open and closed positions of the cover housing relative to the main housing.

33. The travel awning set forth in claim 32 wherein the main support arms extends from the roller into the main housing in the closed position of the cover housing relative to the main housing.

* * * * *